Oct. 7, 1924.
E. C. DITTMAR
1,510,467
MACHINE FOR FINISHING FLOORING
Original Filed July 31, 1919    2 Sheets-Sheet 1
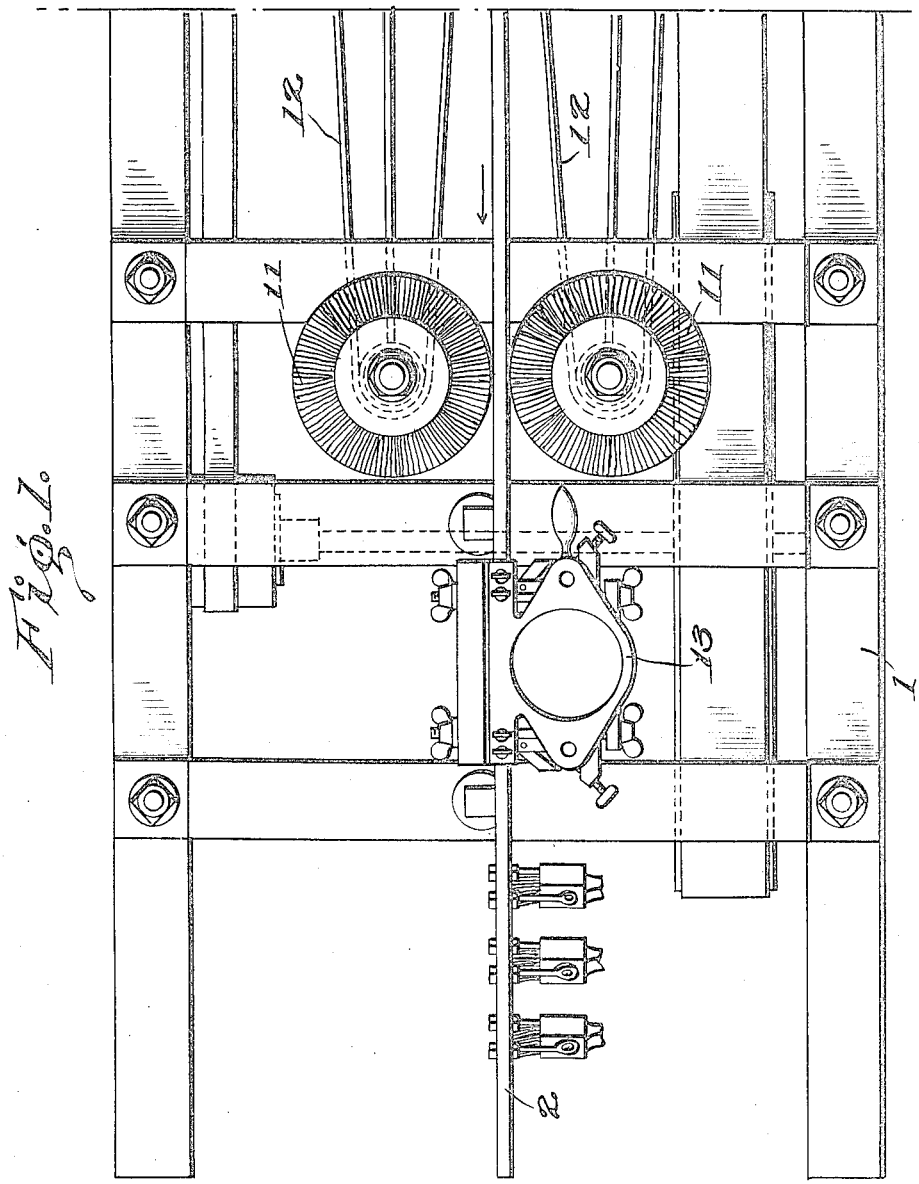
Inventor
E. C. Dittmar
By
Attorney

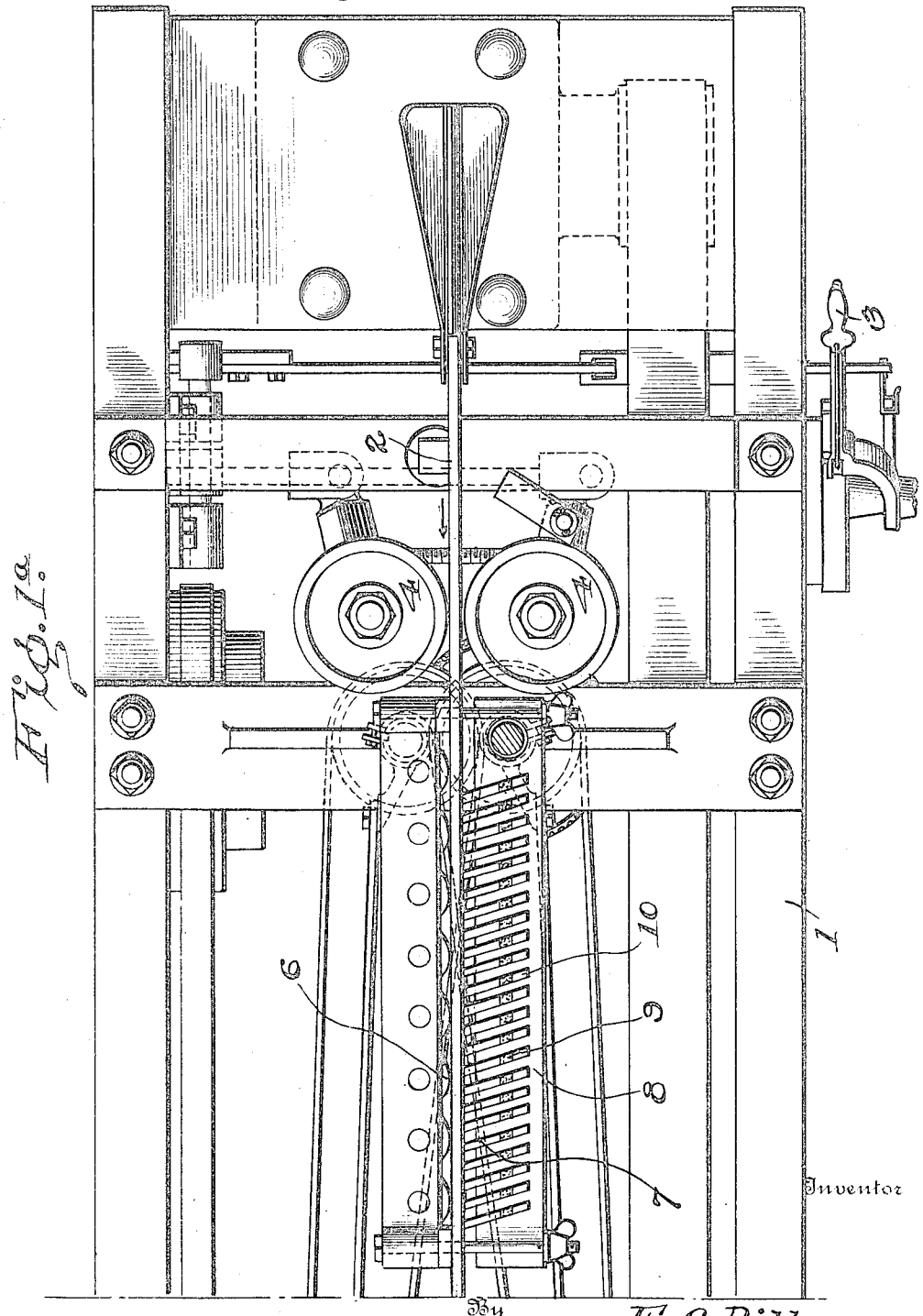

Patented Oct. 7, 1924.

1,510,467

UNITED STATES PATENT OFFICE.

ELMER C. DITTMAR, OF WILLIAMSPORT, PENNSYLVANIA, ASSIGNOR TO THE CROOKS-DITTMAR COMPANY, OF WILLIAMSPORT, PENNSYLVANIA, A CORPORATION OF PENNSYLVANIA.

MACHINE FOR FINISHING FLOORING.

Application filed July 31, 1919, Serial No. 314,466. Renewed November 11, 1922. Serial No. 600,478.

*To all whom it may concern:*

Be it known that I, ELMER C. DITTMAR, citizen of the United States, residing at Williamsport, in the county of Lycoming and State of Pennsylvania, have invented certain new and useful Improvements in Machines for Finishing Flooring, of which the following is a specification, reference being had therein to the accompanying drawing.

This invention relates to a machine for finishing flooring and is a companion of my applications executed even date herewith and filed July 31, 1919, Serial Numbers 314,464 and 314,465 the object of the present invention being to provide a machine for applying the second coating of varnish to the flooring strip after it has been treated by passing through the above mentioned machines.

Another object of the invention is to provide an apparatus which is so constructed that the frame and driving mechanism are substantially identical with those shown in the above referred to applications with the exception that the parts are re-arranged, and a series of glass burnishers are employed for smoothing and burnishing the surface previously coated with varnish so as to eliminate the use of sand paper, and to provide a machine by means of which a high finish can be obtained on the surface coated.

Another and further object of the invention is to provide means for removing all dirt and dust or foreign matter from the strip before the last coat of varnish is applied.

Other and further objects and advantages of the invention will be hereinafter set forth and the novel features thereof defined by the appended claims.

In the drawings:

Figure 1 is a top plan view of the delivery end of an apparatus constructed in accordance with my invention.

Figure 1ª is a top plan view of the feed end of the apparatus.

In carrying out my invention I employ a frame 1 and driving mechanism constructed identically with that shown in my applications Serial Numbers 314,464 and 314,465, the same being provided with a guideway 2 for supporting and guiding the strip of flooring on edge in its passage through the machine.

The strip of flooring is moved continuously through the guideway by a pair of feed rollers 4 held in contact with the opposite faces of the strip of flooring through the medium of links, crank and weighted arm, the details of construction of which are clearly shown in the above referred to companion cases, said weighted arm being controlled by a lever 5 which enables the feed rollers to be moved into and out of contact with the strip so as to stop the movement thereof or cause the strip to move at the will of the operator. Arranged to one side of the guideway 2 in advance of the feed rollers are a series of rollers 6 for preventing the strip from yielding when pressure is applied through the medium of a series of burnishers 7 which are mounted in a suitable support 8 carried by the guideway. The said burnishers are held in contact with the surface by rubber blocks 9 and wedges 10 whereby the desired pressure can be obtained, and the glass burnishers will be yieldingly held in contact with the strip. These burnishers act on the varnished face of the strip so as to level the face and burnish the varnish, whereby the use of sand paper is eliminated and a smooth surface is formed on the previously varnished face.

The construction of burnishers and the manner of mounting the same in the support is clearly shown in my companion application Serial No. 314,465 filed even date herewith.

As the strip of flooring leaves the burnishers it passes between a pair of revolving brushes 11 so as to thoroughly clean the strip before it reaches the varnish receptacle. The brushes are mounted on movable arms and driven by belts 12 in substantially the same manner as shown in my companion applications Serial Numbers 314,464 and 314,465.

Arranged in advance of the brushes is a receptacle 13 constructed identically as shown in my companion applications, Cases A and B, which receptacle is provided with a discharge opening over which passes the strip of flooring so that the face thereof will be given a coating of varnish.

As the strip of flooring leaves the varnish receptacle 13 it passes under a series of stationary brushes so as to give an even flow or to spread the varnish evenly over the surface.

From the foregoing description it will be seen that I have provided an apparatus for applying a second coat of varnish to a previously varnished strip of lumber which is provided with means for burnishing the face of the strip as it passes therethrough, and then for cleaning the same thoroughly through the medium of a pair of revolving brushes so that the strip will be thoroughly cleaned before it reaches the varnish receptacle. As the strip passes over the discharge opening of the varnish receptacle the face of the strip is given a coat of varnish, and as the strip is moving continuously it passes under a series of stationary brushes which spread the varnish evenly over the surface so as to form a smooth surface.

I have described in the specification the operation of the apparatus for applying the second coating of varnish to a strip of flooring, but it is of course understood that the apparatus could be used for coating and finishing strips of lumber of various kinds, such as wainscoting and molding, and I do not wish to limit myself to the use of one set of devices for accomplishing this result as the parts could be duplicated, so that both faces of the strip of lumber in its passage through the machine would be coated and finished.

What I claim is:

1. An apparatus for applying a second coat of varnish to a strip of lumber having means for guiding and supporting a strip of lumber on edge, means for moving said strip in said guideway, a series of glass burnishers arranged in the path of travel of said strip for smoothing the previously varnished face thereof, a pair of revolving brushes arranged to engage the opposite faces of said strip for removing foreign matter therefrom, a receptacle having a discharge opening for applying a coating of varnish to one face of said strip, and a series of stationary brushes arranged in the path of travel of said strip for spreading the coating of varnish applied.

2. An apparatus for applying a second coat of varnish to a strip of flooring, having means for moving the strip continuously on edge, means for burnishing one face of the strip in its movement through the machine, means for cleaning the opposing faces of said strip, means for applying a coating of varnish to the moving strip, and a stationary brush arranged in the path of travel of said strip for spreading the coating of varnish previously applied.

3. An apparatus for finishing a flooring strip having a guideway for supporting and guiding a strip of flooring on edge in its passage through said guideway, a pair of feeding rollers for moving the strip in said guideway, a series of rollers arranged to engage one face of said strip, a series of glass burnishers arranged to engage the opposite face of said strip in transverse alignment with said rollers, a pair of rotary brushes for cleaning said strip after it has been acted on by said burnishers, a varnish tank having a discharge opening over which said strip passes for receiving a coating of varnish, and a series of stationary brushes arranged in the path of travel of said strip for spreading the coating of varnish applied.

4. An apparatus for finishing strips of flooring, comprising means for continuously moving a strip of flooring on edge, a series of yieldably supported glass burnishers arranged to engage one face of said strip, a pair of revolving brushes between which said strip passes in its movement through said machine, a varnish receptacle having a discharge opening over which said strip passes to receive a coating of varnish, and a plurality of stationary brushes arranged to spread the varnish applied to the face of said strip in its passage through said machine.

5. An apparatus for applying a coating of varnish to a previously coated strip of flooring, comprising a guideway for supporting a strip on edge, a pair of feed rollers arranged to engage the opposite faces of said strip for moving said strip in said guideway, a series of burnishers arranged to engage one face of said strip in its passage through said guideway, a receptacle for applying varnish to the face of said strip in its passage through said guideway, and means for spreading the varnish applied.

6. An apparatus for applying a second coat of varnish to a strip of flooring having means for moving the strip on edge, means for burnishing the face of the strip in its movement through the machine, means for cleaning the strip, means for applying a coating of varnish to the moving strip and a brush arranged in the path of travel of said strip for spreading the coating of varnish previously applied.

7. In an apparatus for applying a coating to a strip of flooring having a guide way for supporting and guiding a strip on edge in its passage therethrough, means arranged adjacent one end of said guide way for moving said strip in said guide way, means for burnishing one face of said strip in its movement through said guide way, means for applying a coating to the burnished face of said moving strip and means for spreading the coating previously applied.

8. An apparatus for finishing strips of lumber having means for supporting a strip of lumber on edge and moving the strip in said supporting means, means for burnishing one face of the strip in its movement through said supporting means, means for cleaning said strip after being burnished, means for applying a coating to the burnished face of said strip and brushes arranged in the path of travel of said strip for spreading the coating applied.

In testimony whereof I hereunto affix my signature in the presence of two witnesses.

ELMER C. DITTMAR.

Witnesses:
HARRY D. LYNNE,
M. F. WILSON.